United States Patent [19]

Abujudom, II et al.

[11] Patent Number: 4,976,327
[45] Date of Patent: Dec. 11, 1990

[54] BATTERY MODULE FOR THE ENGINE COMPARTMENT OF AN AUTOMOBILE

[75] Inventors: David N. Abujudom, II, Brookfield; Thomas J. Dougherty, Waukesha; Mark S. Inkmann, Milwaukee; Richard T. Johnson, Hubertus; Neil C. Karolek; David W. Saari, both of South Milwaukee, all of Wis.

[73] Assignee: Globe-Union Inc., Milwaukee, Wis.

[21] Appl. No.: 311,149

[22] Filed: Feb. 14, 1989

[51] Int. Cl.5 ................... B60K 11/00; B60K 13/02; B60R 16/04
[52] U.S. Cl. ................................ 180/68.2; 180/68.3; 180/68.5
[58] Field of Search .................... 180/68.5, 68.2, 68.3; 296/371; 237/12.3 A

[56] References Cited

U.S. PATENT DOCUMENTS

| 2,104,769 | 1/1938 | Saunders | 180/68.5 |
| 2,717,045 | 9/1955 | Nallinger | 180/68.2 |
| 3,977,490 | 8/1976 | Flaig | 180/68.5 |
| 4,065,170 | 12/1977 | Fabian et al. | 180/68.2 |

Primary Examiner—Charles A. Marmor
Assistant Examiner—Richard Camby
Attorney, Agent, or Firm—Foley & Lardner

[57] ABSTRACT

A battery module for insulating a battery from the heat of the engine of a motor vehicle, the module including a battery compartment, an air inlet and an air outlet, a first air flow path connecting the air inlet to the air outlet and a second air flow path around the outside of the battery compartment connecting the air inlet to the air outlet, a damper positioned in the housing for movement between a first position wherein the first air flow path is open and the second air flow path is closed and a second position wherein the first air flow path is closed and the second air flow path is open, a shape memory alloy member for moving the damper from the first position to the second position when the ambient temperature exceeds a predetermined minimum and a spring for biasing the damper to the first position when the ambient temperature is less than the predetermined temperature.

18 Claims, 3 Drawing Sheets

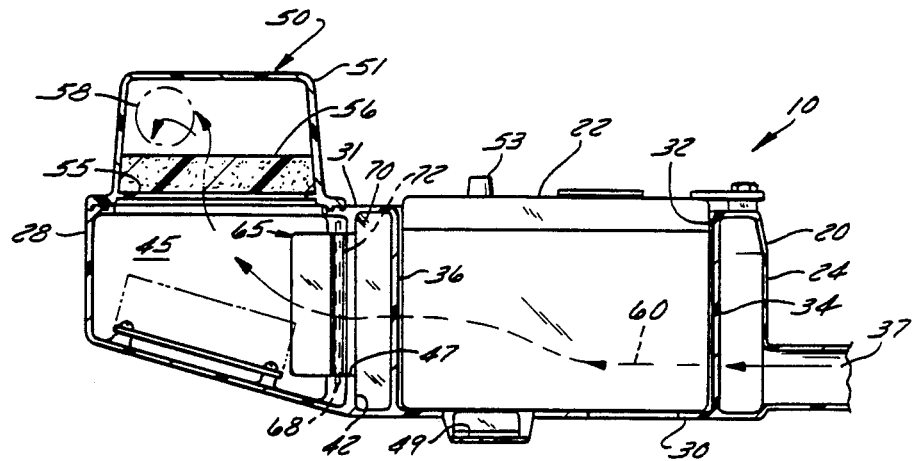

BATTERY MODULE FOR THE ENGINE COMPARTMENT OF AN AUTOMOBILE

BACKGROUND OF THE INVENTION

1. Field of the Invention

The present invention relates to a module for protecting a vehicle battery from extreme high temperature conditions. The module is adapted to be mounted in the front of the engine compartment of the vehicle.

2. Description of the Prior Art

The battery life of present day automobiles is dependent on three primary factors: operating temperatures, depth of discharge and recharge characteristics. Recent trends in vehicle design have adversely altered the environmental conditions to which the battery is exposed. This is attributed to the increase in underhood air temperature and battery temperature due to vehicle down sizing and improvements to the vehicle aerodynamics, the additon of electrical and electronic accessory loads and the resulting increase in battery depth of discharge. In warm climates, underhood temperatures are as high as 190° F. to 240° F. At these temperatures the battery grids are subject to accelerated corrosion and battery water loss occurs due to electrolysis caused by an excessive charge rate and, in some instances, boiling of the water. This undercharge or overcharge condition exists if there is a difference in temperature between the voltage regulator and the battery. This discrepency between voltage regulator temperature and battery temperature occurs due to a large difference in thermal mass between the two components. During a typical daily drive cycle this temperature difference allows both undercharge and overcharge conditions to exist.

U.S. Pat. No. 4,065,170 issued Dec. 27, 1977 and entitled "Front Section of a Motor Vehicle, Especially of a Passenger Motor Vehicle" discloses an auxiliary component compartment which is provided at the rear of the engine space of an automobile for accomodating the auxiliary components required for the vehicle. These components are mounted within the compartment and include the expansion tank for the cooling system, a vehicle battery, a supply tank for a level regulator, a hydraulic unit for a antiblocking system, a cruise control, a dryer for the air conditioner, a brake apparatus, a tank for the windshield wiper fluid, a transistorized circuit device in the ignition coil, and a series of resistances, fuses, relay, and electronic control apparatus. These components are positioned in this space in order to clear the air space around the engine thereby creating a tunnel effect so that a cooling air stream can flow along both sides of the engine. The air is discharged through a tunnel to the exhaust catalyst located at the bottom of the engine. There is no provision in this system providing specific cooling of the auxiliary components which are affected by heat under the hood of a car.

SUMMARY OF THE INVENTION

The battery module of the present invention has been designed to provide reductions in three main areas of concern in present day automobiles. These are vehicle assembly costs, number of molded parts and inventory. To reduce the effect of high temperatures in the engine compartment on the battery of the automobile, the module, according to the present invention, incorporates aspects of passive and active thermal management. Through the use of a shape memory alloy member and a variable position damper, engine intake air is routed either directly to the air cleaner or around the outside of the battery. The damper position is changed as the outside air temperature increases from 60° to 70° F. to divert the incoming air from a direct flow path to the air cleaner to a secondary air flow path around the battery and then to the air cleaner. The battery temperature is thereby maintained at a considerably lower temperature than the ambient air temperature under the hood. The damper position is changed as the outside temperature increases or decreases to divert the incoming air.

A further feature of the invention is the location of the voltage regulator or voltage regulator thermal sensing element in the bottom of the module in physical contact with the bottom of the battery. The voltage regulator will thereby follow the temperature of the battery reducing the possibility of undercharge or overcharge of the battery.

Another feature of the invention is the ability to house and cool other operational electronic components of the engine in the module.

Another feature of the invention is the insulation of the battery from the high underhood temperatures during engine off conditions by the double wall provided around the battery in the module.

Other features and advantages of the invention will become apparent to those skilled in the art upon review of the following description, claims and drawings.

BRIEF DESCRIPTION OF THE DRAWINGS

FIG. 5 is a view taken on line 5—5 of FIG. 4 showing the damper.

FIG. 6 is a view taken on line 6—6 of FIG. 4 showing the flow path through the electronic control compartment.

FIG. 7 is a view of the damper open to direct air flow.

FIG. 8 is a view of the damper open to bypass air around the battery compartment.

Figure 1:
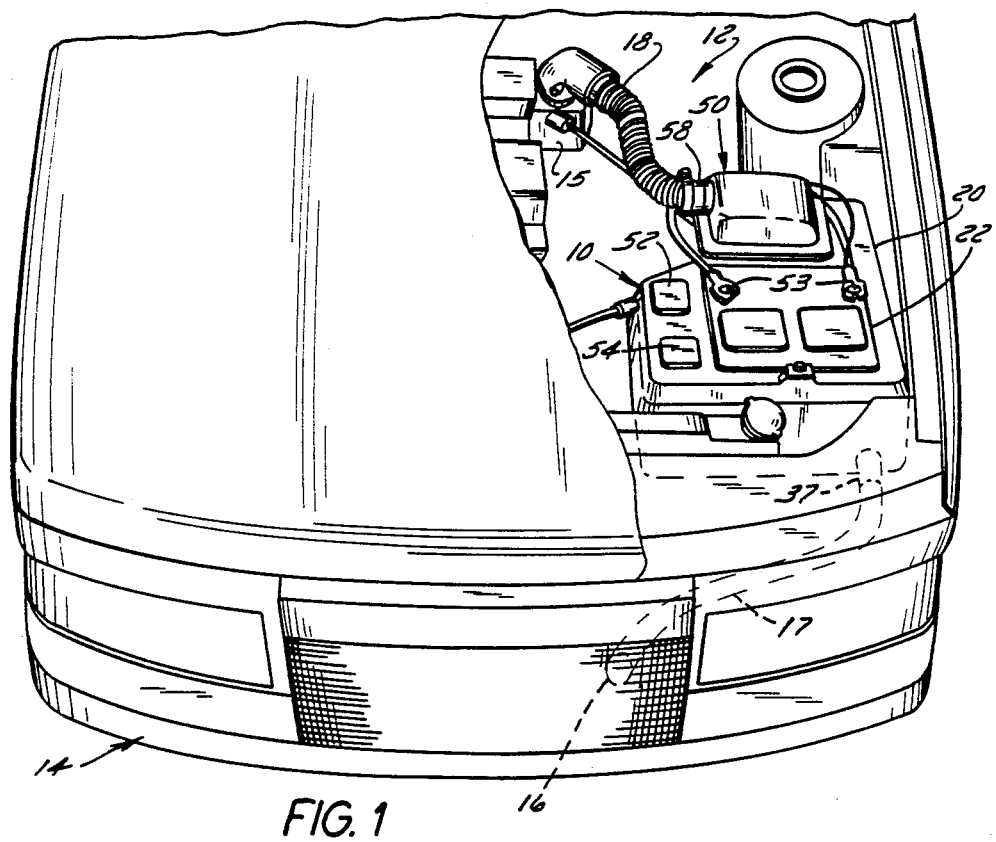
FIG. 1 is a perspective view of the front end of an automobile showing the battery module positioned in the front of the engine compartment.

Before describing one embodiment of the invention in detail, it is to be understood that the invention is not limited in its application to the details as set forth in the following description or illustrated in the drawings. The invention is capable of other embodiments and of being practiced or carried out in various ways. Also, it is to be understood that the phraseology and terminology used herein is for the purposes of description and should not be regarded as limiting.

DETAILED DESCRIPTION OF AN EXEMPLARY EMBODIMENT

Figure 2:
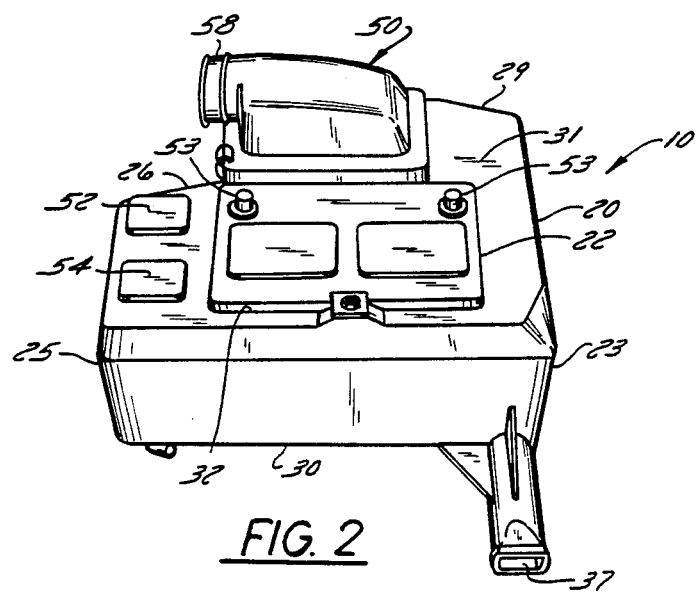
FIG. 2 is a perspective view of the operational component module.

The battery module 10 as shown in FIGS. 1 and 2 is mounted in the front of the engine compartment 12 of an automobile 14. The module is connected at one end to the engine air intake 16 by means of a flexible duct 17 and at the other end to the engine carburetor or fuel injector 15 by means of a flexible duct 18. The battery module 10 is in the form of a plastic enclosure 20 which provides an insulating air gap between the underhood high temperature air and a battery 22 housed in the enclosure.

The enclosure 20 generally includes outer side walls 23, 24, 25, 26, 27, 28, and 29, a bottom 30, and a top or cover 31. A battery compartment 32 is provided within the side walls of the enclosure and is defined by means of walls 33, 34, 35, and 36. The top of the battery compartment is left open to provide access to the battery terminals 53. Air is admitted into the enclosure 20 through an air intake opening 37 and is discharged from the enclosure through an air outlet 47 to a cover assembly 50 which is connected to the engine. A voltage regulator compartment 49 (FIG. 6) is provided in the bottom 30 of the module so that the voltage regulator can be placed in abutting relation to the battery casing and will be directly responsive to battery temperature.

Means are provided within the enclosure 20 for insulating the battery compartment 32 from the heat of the engine compartment. Such means is in the form of a windshield washer reservoir 52, a radiator overflow reservoir 54 and an electrical component compartment 45 which are located in the enclosure between the engine compartment and the battery compartment. In this regard the reservoirs 52 and 54 are formed by a partition 40 connecting side walls 24 and 26 and a partition 41 connected between partition 40 and side wall 25.

The electrical components compartment 45 is defined by means of a partition 42 connected between side walls 23 and 27 and a partition 43 connected between partition 42 and side wall 28. An air passage 47 is provided in partition 42. The components compartment 45 is closed at the top by means of a cover assembly 50.

In this regard, it should be noted that the cover assembly 50 includes a cover or cap 51 having a discharge nozzle 58 and a flange 55 around the bottom of the cover for supporting an air cleaner filter 56. The filter 56 is positioned to filter air as it passes through the component 45 for discharge through the outlet nozzle 58.

A first air flow path 60 is provided through the enclosure in the space between the side wall 23 and battery compartment wall 33. A second air flow path 62 is provided around the battery compartment 22 in the space between the battery compartment walls 34, 35 and 36 and the corresponding portions of side wall 24, partition 40, side wall 26 and partition 42. The air flowing through the first and second air flow paths 60 and 62 passes through opening 47 into the electric components compartment 45 and out through air filter 56 in cover assembly 50 for discharge through nozzle 58 to duct 18. With this arrangement air passing through the electrical component compartment 45 will also cool the electrical components such as an engine management computer, a distributorless ignition module, an antilock braking control or other electronic modules housed therein.

Means are provided for controlling the flow of air through the first air flow path 60 and the second air flow path 62. Such means is in the form of a damper 65 provided in the opening 47 in the partition 42. The damper 65 is mounted on the edge of a partition 70 that intersects the compartment wall 36 and divides the opening 47 in partition 42 into a first opening 47a and a second opening 47b. The damper 65 includes a pair of panels 62 and 64 which are connected to a post 67 at a right angle. The damper 65 is supported for pivotal movement by means of a pin 68 which passes through the top 31, an opening 72 in post 67 and the bottom 30.

Figure 4:
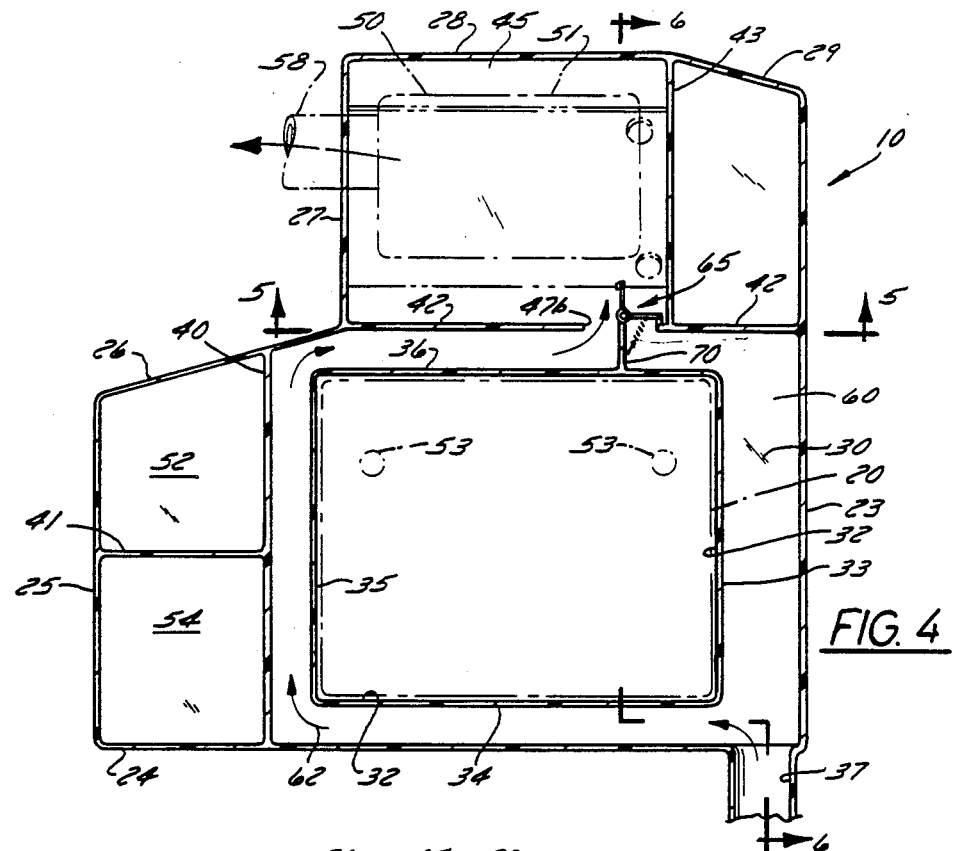
FIG. 4 is a view similar to FIG. 3 showing the air flow path around the exterior of the battery compartment in the module.
Figure 3:
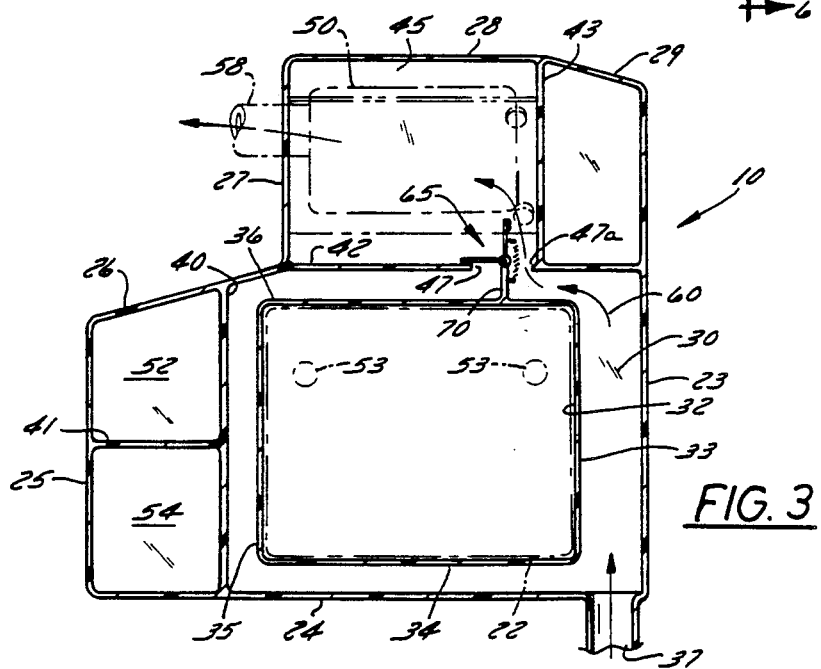
FIG. 3 is a top view in section showing the air flow path through the module.

The damper 65 is normally biased to the position shown in FIG. 3 by means of a helical spring 74. In this position the first opening 47a is open allowing air to pass directly through the first air passage 60 into the electric components compartment 45. The damper 65 is pivoted to the position shown in FIG. 4 when the outside air temperature reaches the desired actuation temperature (60° to 70° F.) by means of a shape memory alloy member 76 which is connected to partition 70 by a pin 71 and to panel 62 by an arm 73. Although a shape memory alloy member is shown and described herein, there are other temperature responsive devices that could be used to perform this function such as bimetals and/or temperature responsive switches and actuators.

A shape memory alloy member is preferred because of its ability to positively react to temperature variations acting as the sensing as well as the actuating element. In this regard, the shape memory alloy member 76 is of the type shown and described in U.S. Pat. application Ser. No. 183,818 filed on Apr. 20, 1988, and entitled "Process to Control the Transition Temperature of SMA". This application is assigned to the same assignee. As described therein, the shape memory alloy member can be processed to return to a preset shape at specified temperatures. In this application, the shape memory member 76 is shown in the shape of a spring, however, other shapes can be used to perform the closing action. The member 76 will start closing the opening 47a when the desired temperature is reached 60° F. and will be fully closed at 70° F.

It should be noted that the member 76 is exposed to the ambient air in air flow passages 60. As the damper 65 closes the first opening 47a, the second opening 47b will open allowing the incoming air to flow through the second air flow passage 62 to cool the outside surface of the battery compartment 22. With this arrangement, the battery temperature will be approximately the same as the ambient air temperature.

It should also be noted that the member 76 is exposed to the ambient air temperature at all times. In this regard, the end of arm 71 in partition 70 is exposed to the temperature of the air flowing through passage 62. The temperature of the pin 71 will, therefore, be transferred to the member 76. The member 76 may also be continually exposed to air flow by providing air holes 69 in partition 70b or by allowing some air to flow around the edges of panel 62.

It should be apparent that there has been provided in accordance with the invention, a battery module that fully satisfies the aims and advantages set forth above. While the invention has been described in conjunction with specific embodiments thereof, it is evident that many alternatives, modifications, and variations will become apparent to those skilled in the art. Accordingly, it is intended to embrace all such alternatives, modifications, and variations as fall within the spirit and broad scope of the appended claims.

The embodiments of the invention in which an exclusive property or privilege is claimed are defined as follows:

1. In a front section of a motor vehicle having an engine compartment enclosed by a hood, an engine having an air inlet mounted in the compartment, a battery module mounted in the engine compartment, said module comprising:

a housing for enclosing a battery within the engine compartment separately from the engine, said housing including an air inlet, an air outlet and a battery compartment, said air outlet being connected to the air inlet to the engine, a first air flow path through said housing between said air inlet and said air outlet, a second air flow path between said air inlet and said air outlet around the outside of said battery compartment, and temperature responsive means in said first air flow path including a shape memory alloy member and a damper for diverting air from said first air flow path to said second air path when the ambient air temperature exceeds a predetermined temperature.

2. The module according to claim 1 wherein said housing includes an electrical component compartment connected between said air outlet and said engine air inlet.

3. The module according to claim 2 wherein said module includes a window washer reservoir and a radiator overflow reservoir located in the module between the engine compartment and the battery compartment.

4. The module according to claim 3 wherein said responsive means includes a spring mounted within said housing for biasing said damper to a first position wherein said first flow path is open and said second flow path is closed.

5. The module according to claim 4 wherein said shape memory alloy member is positioned to move said damper from said first position, to a second position when the ambient air temperature exceeds a predetermined temperature.

6. The module according to claim 5 wherein said shape memory alloy member is in the form of a spring.

7. A battery module for insulating a battery of an automobile from the heat of an engine in the engine compartment of the automobile, said module comprising:

a housing having an air inlet and an air outlet connected to the fuel injector for the engine, means defining a battery compartment in said housing, and temperature responsive means including a shape memory allow member and a damper for selectively directing air through a first air flow path from said air inlet to said air outlet or through a second air flow path from said air inlet around said battery compartment to said air outlet whereby the temperature of the battery will be maintained at approximately ambient air temperature.

8. The module according to claim 7 wherein said damper is moved between open and closed positions with respect to said first air flow path and closed to open positions with respect to said second air flow path.

9. The module according to claim 7 wherein said shape memory alloy member is operatively connected to move said damper from the open to the closed position with respect to the first air flow path and the closed to the open position with respect to the second air flow path.

10. The module according to claim 9 including means for biasing said damper to the open position with respect to the first air flow path and to the closed position with respect to the second air flow path.

11. In a front section of a motor vehicle having an engine compartment enclosed by a hood, an engine having an air inlet mounted in the compartment and a battery module for housing a battery, said module comprising:

means for enclosing the battery of said vehicle within said engine compartment separately from the engine, said enclosing means including a battery compartment and an electrical component compartment having an inlet and an air outlet connected to the air intake of the engine, a first air flow path through said enclosing means along one side of said battery compartment, a second air flow path around the other sides of said battery compartment, said first and second air flow paths being connected to said air inlet to said electrical component compartment, and temperature responsive means including a shape memory alloy member and a damper in said first air flow path for diverting air from said first air flow path to said second air flow path when the temperature of the incoming air exceeds a predetermined temperature.

12. The module according to claim 11 wherein said module includes a window washer reservoir and a radiator overflow reservoir positioned between said engine compartment and said battery compartment whereby said battery is insulated from the heat of the engine.

13. The module according to claim 13 including a shape memory alloy member operatively connected to said damper to close said first air flow path and open said second air flow path when the ambient temperature exceeds a predetermined temperature.

14. The module according to claim 13 wherein said member is in the form of a spring.

15. A battery module for a motor vehicle engine compartment comprising:

a housing for insulating a battery from the heat of a motor vehicle engine, said housing including a battery compartment, an air inlet and an air outlet, a first air flow path in said housing connecting said air inlet to said air outlet, a second air flow path in said housing formed around the outside of said battery compartment and connecting said air inlet to said air outlet, a damper mounted within said housing for movement between a first position wherein said first air flow path is open and said second air flow path is closed and a second position wherein said first air flow path is closed and said second air flow path is open, and a shape memory alloy member operatively connected to said damper and being positioned to respond to the temperature of the air flowing through the module for moving said damper from said first position to said second position when the temperature of the air exceeds a predetermined temperature.

16. The module according to claim 15 including means for biasing said damper from said second position to said first position when the temperature of the air flowing through the module is less than the predetermined temperature.

17. The module according to claim 16 wherein said housing includes an electrical components compartment connected to said air outlet whereby air discharged from said air outlet will cool the electrical components housed in said compartment.

18. The module according to claim 17 wherein said components compartment includes a discharge outlet operatively connected to the engine and an air cleaner filter mounted in said components compartment in a position to filter air flow to the engine.

* * * * *